United States Patent [19]
Demeure

[11] Patent Number: 6,160,500
[45] Date of Patent: Dec. 12, 2000

[54] CODING PROCESS FOR A SIGNAL PROCESSOR, AND PROCESSOR FOR THE IMPLEMENTATION OF SUCH A PROCESS

[75] Inventor: Alain Demeure, Nice, France

[73] Assignee: Thomson-CSF, Paris, France

[21] Appl. No.: 09/147,192

[22] PCT Filed: Apr. 18, 1997

[86] PCT No.: PCT/FR97/00707

§ 371 Date: Oct. 26, 1998

§ 102(e) Date: Oct. 26, 1998

[87] PCT Pub. No.: WO97/41518

PCT Pub. Date: Nov. 6, 1997

[30] Foreign Application Priority Data

Apr. 26, 1996 [FR] France .................................. 96 05325

[51] Int. Cl.$^7$ ............................................... H03M 7/00
[52] U.S. Cl. ............................................... 341/50
[58] Field of Search ................... 341/50, 55, 51; 369/34, 36; 360/92

[56] References Cited

U.S. PATENT DOCUMENTS

| | | |
|---|---|---|
| 4,542,455 | 9/1985 | Demeure . |
| 4,604,736 | 8/1986 | Demeure . |
| 4,661,957 | 4/1987 | Okuhara ................................... 371/59 |
| 5,715,216 | 2/1998 | Dang et al. ............................... 369/34 |

*Primary Examiner*—Brian Young
*Attorney, Agent, or Firm*—Oblon, Spivak, McClelland, Maier & Neustadt, P.C.

[57] ABSTRACT

A special purpose processor for data processing. A transformation is determined in order to represent the input and output data as multidimensional spaces. The transformation is represented by an input matrix and an output matrix. These matrices make it possible to program the selection of the input and output data in a systematic manner and to determine a processor structure which is especially adapted to such programming. The system simplifies the use of processors operating in parallel.

8 Claims, 5 Drawing Sheets

CODING PROCESS FOR A SIGNAL PROCESSOR, AND PROCESSOR FOR THE IMPLEMENTATION OF SUCH A PROCESS

BACKGROUND OF THE INVENTION

FIELD OF THE INVENTION

The present invention relates to processes which make it possible to code special-purpose signal processors. It relates also to signal processors allowing the implementation of such a process.

DISCUSSION OF THE BACKGROUND

It is known that apart from processors of a general type such as those used for example in personal computers, there are special-purpose processors, especially those intended for processing signals whose structure is especially adapted to the simultaneous execution of several activities. The activities are systematic and involve access to the memories, calculations on data and management of the number of iterations.

By way of example of such a processor mention will be made of those manufactured by the company Analog Device under the references 21020 or 21060.

By referring to the technical handsheet for such a processor, it may be observed that the processing of the data is carried out essentially by repeating two types of elementary actions. One of these actions consists in successively obtaining a certain number of addresses in the memory by using a data address generator (DAG). The other of these actions consists in performing a particular processing operation on the data thus selected and in iterating this processing operation a specified number of times with the aid of a repetition counter (loop count stack). The generating of the addresses and the management of the length of the loop are determined by programming. The programming of these two actions is done separately and the relations between the two are determined by the human programmer, who devises the programs by making a mental note of the necessary relations. There is therefore no automatic aspect and a risk of errors exists.

The inventor has already developed a signal processing application graphical input process making it possible to formalize the signal processing applied to such signals by presenting them in the form of input and output arrays and by establishing systematic relations between these arrays.

This formalism leads to the development of a special-purpose signal processor enabling it to be implemented directly. This graphical input process has formed the subject of a French Patent Application filed by the Applicant on Apr. 7, 1995 under No. 95 04175.

The formalism in question has also formed the subject of a paper at the 1995 GRETSI colloquium at JUAN LES PINS, FRANCE.

Finally, it is planned to present this formalism, as well as programming tools, on the Internet from the University of Berkeley server at the address:

http://ptolemy.eecs.berkeley.edu.

This formalism, which can also be regarded as a language, is known in the art by the name ARRAY-OL.

In the framework of these studies, the inventors have also invented a coding process making it possible to unify the two repetitive actions described above, so as automatically to have the desired result without being obliged to link the two operations mentally at programming level.

SUMMARY OF THE INVENTION

To do this, the invention proposes a coding process for a signal processor, which starts from an input array which is sampled with an input pattern according to an input assembling relation and an input paving relation, each of these patterns is subjected to an elementary transformation TE which delivers output patterns, and an output array is constructed by assembling these output patterns according to an output paving relation and an output fitting relation, principally characterized in that a first output multidimensional space is determined, comprising a first set of axes corresponding to the axes of the quotient array resulting from dividing the output array by the output pattern itself regarded as an output divisor array, and a second set of axes corresponding to the axes of this output divisor array, this first space thus comprising all the outputs of the output array arranged in such a way as to be able to be traversed successively by an incrementation of the clock of the processor, and in that a first projection matrix from this first space to the output array is determined, this making it possible automatically to determine a first coding for placing the outputs in the output array.

According to another characteristic, a second input multidimensional space is determined, comprising a third set of axes corresponding to the axes of the quotient array resulting from dividing the input array by the input pattern itself regarded as an input divisor array, the axes of this third set being identical to those of the first, and a fourth set of axes corresponding to the axes of this input divisor array, this second space thus comprising all the inputs of the input array arranged in such a way as to be able to be traversed successively by an incrementation of the clock of the processor, and in that a second projection matrix from the input array to the second space is determined, this making it possible moreover automatically to determine a second coding for selecting the inputs in the input array.

The invention also proposes a processor for implementing the process, principally characterized in that it comprises a first counter intended to be incremented by a clock and comprising as many stages as axes in the first and the second set of axes, the number of states which each stage can take being equal to the dimension of the first space on the axis corresponding to this stage, in that it comprises a first and a second set of multipliers intended to multiply the outputs of the stages by the coefficients of the said first matrix, and in that it comprises a first and a second summator for respectively adding up the outputs of the adders of the first and second sets of multipliers and for delivering the coefficients of the vector which makes it possible to place the outputs in the output array.

According to another characteristic, the processor furthermore comprises a second counter intended to be incremented by the said clock and comprising as many stages as axes in the fourth set of axes, the number of states which each stage can take being equal to the dimension of the second space on the axis corresponding to this stage, in that it comprises a third and a fourth set of multipliers intended to multiply the outputs of the stages of this second counter and the outputs of the stages of the first counter corresponding to the axes common to the first and to the second spaces by the coefficients of the said second matrix, and in that it comprises a third and a fourth summator for respectively adding up the outputs of the adders of the third and fourth sets of multipliers and for delivering the coefficients of the vector which makes it possible to select the inputs in the input array.

According to another characteristic, each multiplier consists of an accumulator operating at the rate of the signals of the clock, the output of which is looped onto the input by way of an adder which receives the value of the necessary multiplier coefficient, and whose reset-to-zero input is linked to the output of the corresponding stage.

BRIEF DESCRIPTION OF THE DRAWINGS

Other features and advantages of the invention will emerge clearly from the following description presented by way of non-limiting example in conjunction with the appended figures which represent.

DETAILED DESCRIPTION OF THE PREFERRED EMBODIMENTS

Figure 1:
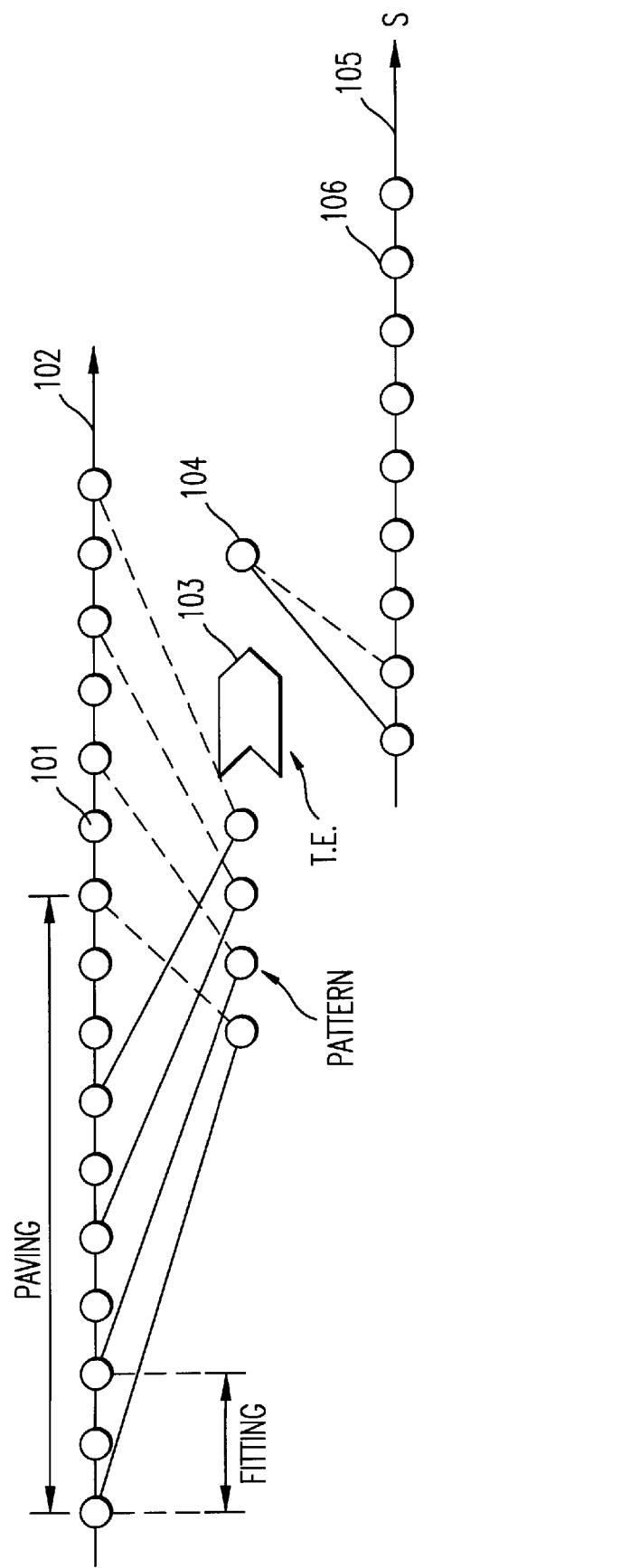
FIG. 1, an elementary graphic for defining the concepts and vocabulary used in the description of the invention.

Represented in FIG. 1 is a set of data 101 placed in an equidistant manner on an axis 102 and corresponding to an input E. These data are for example successive samples over time originating from a single hydrophone.

The processing of these data is done in successive iterations, each corresponding for example to an incrementation over time.

At each iteration, a group of data is selected, defined by a so-called "fitting" relation. In this example, the fitting relation consists in selecting one datum out of two.

The group of data thus selected, four in this example, therefore forms a "pattern" which is subjected to elementary transformation TE symbolized by a large arrowhead 103. In this example, this elementary transformation can for example be a weighted addition which gives a single result 104.

At the next increment, the group of data forming the next pattern is selected based on displacing the previous group by a so-called "paving" distance, which here is 9 spacings. Of course, the fitting for obtaining this pattern is the same as the previous one. The fitting corresponding to the first operation is represented by solid lines between the data selected the first time. The fitting corresponding to the data selected at the next increment with the paving relation is represented by dashed lines.

The results 104 are then grouped together in this example on an axis 105 to form the output information S. The placing of these results 104 on the axis 105 to form the succession of output data 106 is done solely with the aid of a paving relation since here the output pattern is point-like. In this example, for simplicity of explanation, this is simply a trailing of the results 104 one after the other, since they form a single datum.

Here again the line which joins the result 104 to the output datum 106 is solid for the first operation and dashed for the second.

The iteration is then continued, still using the paving relation.

These definitions are generalized in the case in which the data, more generally the inputs, originate from several sources and so have preferably to be placed, for the understanding and arrangement of the processing operations, in representations manifesting several dimensions or several sources. Pursuing the above example, the successive samples over time originating from a set of aligned hydrophones forming for example a sonar antenna will be placed in a rectangular array. To process these signals they will be grouped together with the aid of a pattern subjected to fitting and paving relations. After applying a TE to the successive patterns, the results of these processing operations will be placed back in a results array.

Figure 2:
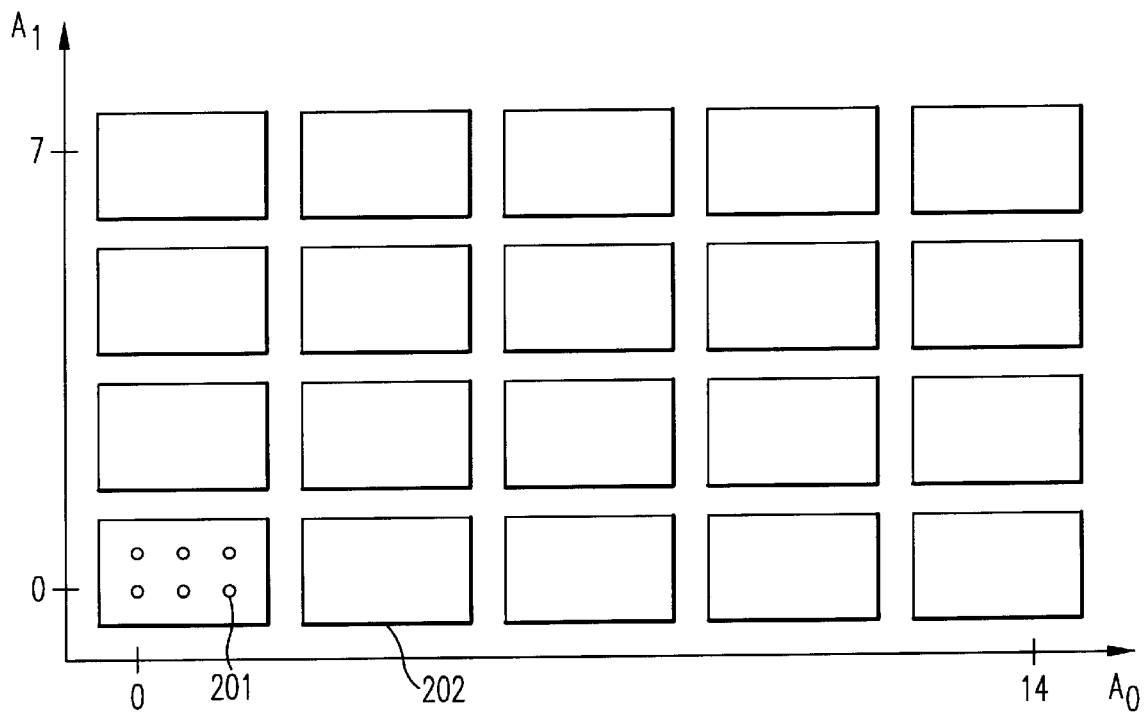
FIG. 2, an example of an array of results.

Represented in FIG. 2 is such a results array in which the outputs 201 are distributed according to a Cartesian coordinate layout having two axes A0 and A1. The description starts from the results array so as to show that the invention makes it possible to obtain, from a simple transformation on this array, a matrix which makes it possible to unify the abovementioned operations. It will then be shown that using the same transformation it is possible, knowing the two input and output patterns of the transformation TE, to unify the same operations on the input data array. However, the results pattern can be one-dimensional.

Thus, although in an input array there is in the general case no reason why the successive patterns selected from this array by the paving so as to be presented to the TE operation should be abutting so as to form a continuous paving, the opposite is the case in a results array where all the results have to be calculated, once only. Hence, a priori they exhibit no redundancy nor require any separating.

The array of FIG. 2 is in this example formed of 15 columns of 8 results grouped into 20 identical contiguous patterns 202 each comprising 3 columns of 2 results. To simplify the figure, the noughts 201 depicting these results are represented in only one of the patterns.

Figure 3:
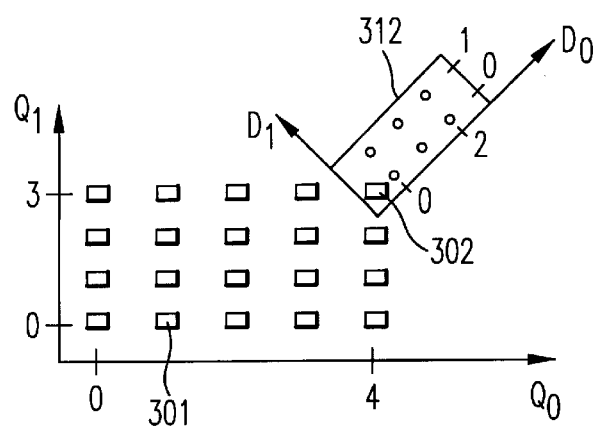
FIG. 3, the "quotient" array obtained by dividing the array of FIG. 2 by the pattern.

Hence, since the patterns are identical the array can then be simplified by restricting it to one point per pattern, given that this point represents the six results of the relevant pattern. The array of FIG. 3 is then obtained, comprising 5 columns and 4 rows of points represented by small squares 301. Since this array is the result of dividing that of FIG. 2 by the pattern, it is termed the quotient array, with dimensions 0/3 and 0/4 on axes Q1 and Q0. As a clear reminder that a point corresponds to a pattern, the pattern 312 associated with the extreme point 302 has been represented superimposed and skewed. This pattern is then termed the divisor array of the result array, with dimensions 0/1 and 0/2 on axes D0 and D1.

Figure 4:
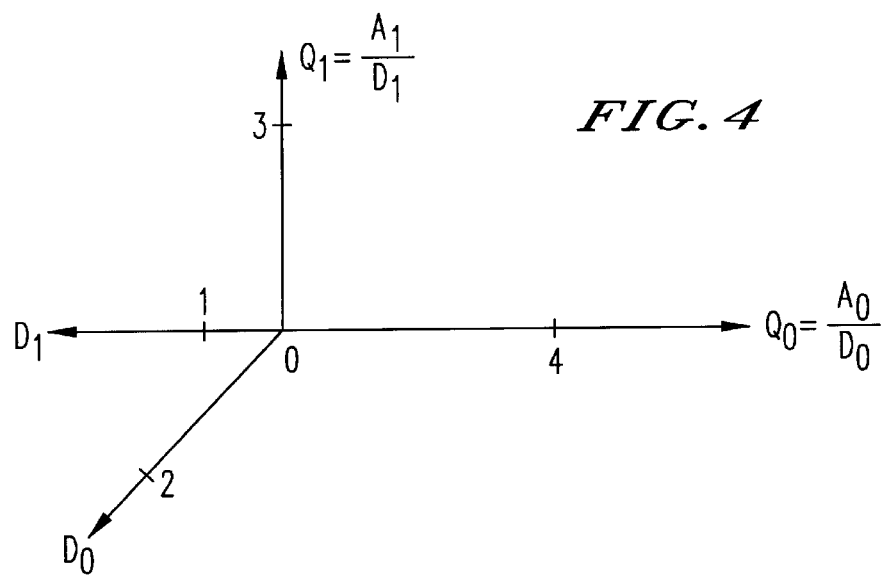
FIG. 4, a representation of the array of FIG. 2 in a Cartesian space of 4 dimensions.

A last simplification then consists in representing the result array in the form of a parallelepiped in a Cartesian space of four dimensions as in FIG. 4. This space comprises four axes:

two axes Q1=A1/D1 and Q0=A0/D0;

two axesD1 and D0; and the parallelepiped therefore has 4 dimensions of respective sizes 4, 5, 2 and 3.

Any result from the array therefore corresponds to a point with integer coordinates of this parallelepiped, which may be represented by a vector {r}={q1, q0, d1, d0}.

Likewise, this result in the array A1/A0 is a two-dimensional vector {R}={a1, a0}.

The correspondence between these two vectors can be obtained by a projection matrix such that: {R}={MP}×{r}.

In this example, the matrix in question, where the first two columns correspond to the paving relation, and the last two to the fitting relation, is given by:

$$\begin{vmatrix} 2 & 0 & 1 & 0 \\ 0 & 3 & 0 & 1 \end{vmatrix}$$

The benefit of this representation is that it is possible to deduce therefrom a hardware implementation which indeed makes it possible to obtain the abovestated unification of the two actions.

Figure 5:
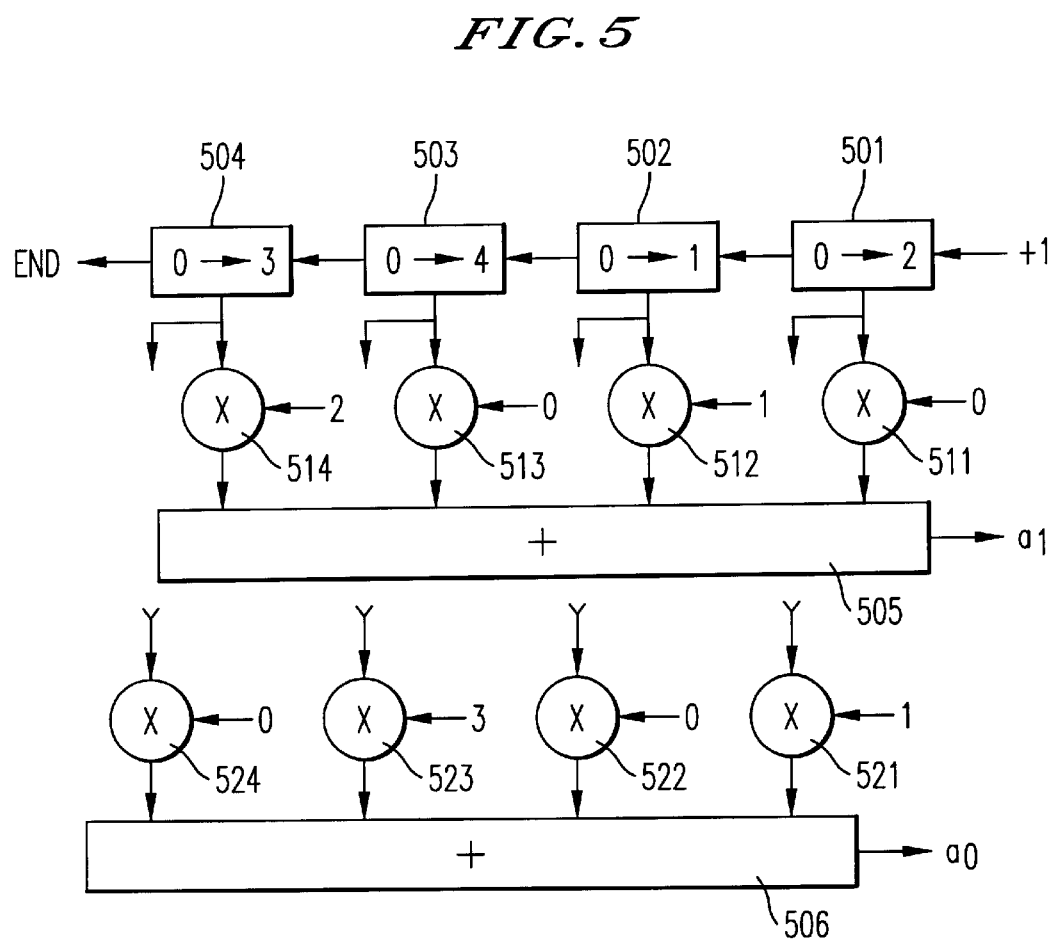
FIG. 5, an example of the implementation of the operations making it possible to go from the array of FIG. 4 to that of FIG. 2.

In an example of an embodiment of such an implementation, represented in FIG. 5, a counter formed of four stages 501 to 504 is employed. These stages can take 3, 2, 5 and 4 states respectively.

A clock at the input of stage 501 increments the latter, and when the latter returns to zero it increments the stage 502, and so on until stage 504 returns to zero, thereby delivering an end-of-operation signal.

Hence, for each clock stroke the state of the set of stages of the counter gives the value of one of the vectors {r} contained in the parallelepiped of the space of FIG. 4.

Hence, at the end of the operations the entire array of results has been traversed, this array being expressed in the form Q/D of FIG. 4.

To obtain these results in the form of the array of FIG. 2, which allows "natural" exploitation of these results, the vector thus obtained must be multiplied by the matrix {MP}.

To do this, at each clock stroke the content of the stages of the counter are multiplied by the values of the coefficients of the matrix.

To do this, use is made of four multipliers 511 to 514 into which are fed the coefficients 0, 1, 0 and 2, and four multipliers 521 to 524 into which are fed the coefficients 1, 0, 3 and 0. Of course, the value 0 makes it possible to dispense with a multiplier, but the latter can be used for other versions of the circuit which are programmed differently.

By then adding up the results of the multiplications in summators 505 (for 511 to 514) and 506 (for 521 to 524), the coefficients a1 and a0 of the vector {R} are obtained, giving the position of the result in the result array of FIG. 2.

Figure 6:
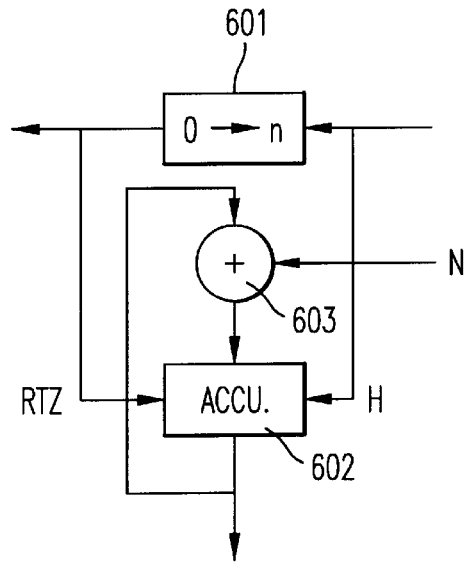
FIG. 6, a simplification of the multiplier stages of FIG. 5.

Since the multipliers are expensive components, a cheaper solution, represented in FIG. 6, consists for each stage such as 601 in linking its input to the clock input H of an accumulator 602 whose output is looped back to its own input by way of an adder 603 which also receives the value of the multiplier coefficient N. This output is applied also to the corresponding summator.

The output of stage 601 is applied to the reset-to-zero input of the accumulator, and when this stage returns to zero so does the accumulator.

Figure 7:
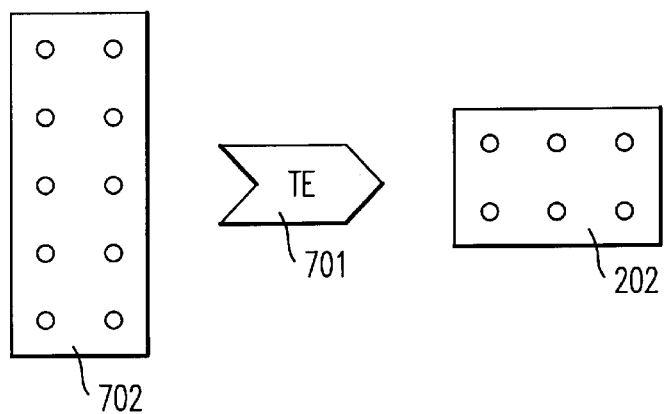
FIG. 7, an example of an elementary transformation TE showing that the input and output patterns are generated differently.

The same reasoning makes it possible to represent the input array as a Cartesian space of four dimensions. This space will be different from that described earlier since the TE operation generally maps input patterns and results of different dimensions. For example, as represented in FIG. 7, the pattern 202 of FIG. 2 is obtained by a TE operation 701, of filtering for example, on a pattern 702 comprising 2 columns and 5 rows.

However, since the TE delivers a single pattern of results from a single pattern of inputs, it is clear that in the Cartesian space of the inputs, the axes Q1 and Q0 will be the same. The other two axes, corresponding to the divisor pattern, will be different and will be termed D'1 and D'0.

Figure 8:
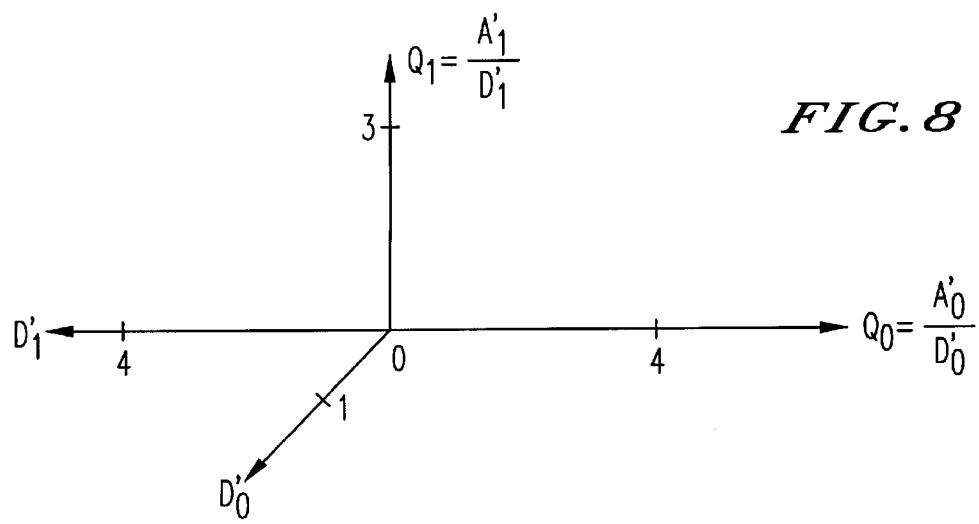
FIG. 8, a representation in a Cartesian space of 4 dimensions of an input array.

Hence, given the size of the pattern, the parallelepiped which in this Cartesian space represents the input array will have dimensions 3, 4, 4 and 1, as represented in FIG. 8. The axes Q1 and Q0 will then be defined by the relations:

Q1=A'1/D'1 and Q0=A'0/D'0 in which the axes A'1 and A'0 are now the axes of the input array.

Every input of the array therefore corresponds to a point with integer coordinates of this parallelepiped, which can be represented by a vector {e}={q1, q0, d'1, d'0}.

Likewise, this input in the "natural" array A'1/A'0 is a two-dimensional vector {E}={a'1, a'0}.

Here again the mapping between these two vectors can be obtained by another projection matrix such that: {E}={MP'}×{e}.

This matrix is of course to be defined as a function of the fitting and paving relations applied to the array A'1/A'0. We have seen that these relations might be much more complex than in the array A1/A0.

Figure 9:
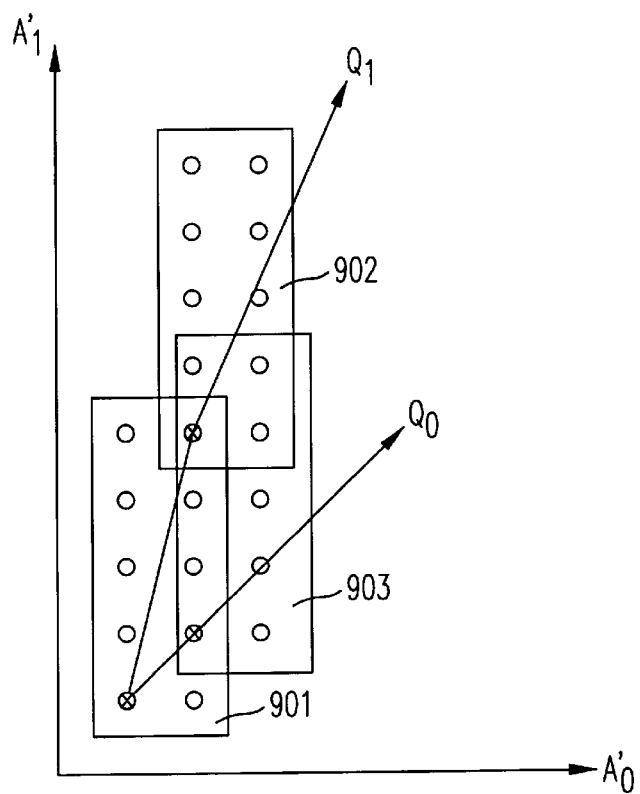
FIG. 9, a simplified input array with the first three patterns arising from the paving.

By way of example, represented in a partial manner in FIG. 9 is an input array comprising a base pattern 901 and the first two following patterns taken on the axes Q1 and Q0. The inputs defining the ends of the unit vectors on the axes Q1 and Q0 have been denoted by crosses. It may be observed that all the elements thus represented are sufficient to define the transformation, and hence the matrix, for going from {E} to {e}.

In this example, the matrix in question, where the first two columns correspond to the paving relation, and the last two to the fitting relation, is given by:

$$\begin{vmatrix} 4 & 1 & 1 & 0 \\ 1 & 1 & 0 & 1 \end{vmatrix}$$

It is observed that on account of the skewed shifting of the patterns in the paving relation, and correspondingly of the axes Q1 and Q0, there is no zero in the first two columns of the matrix.

Hence, in the same way as for the array of results, it is possible to obtain a hardware implementation which here again enables the two actions to be unified as stated earlier. Furthermore, this implementation can contain a part which is common with that used for the results array since the calculation of the coefficients q1 and q0 is the same.

Figure 10:
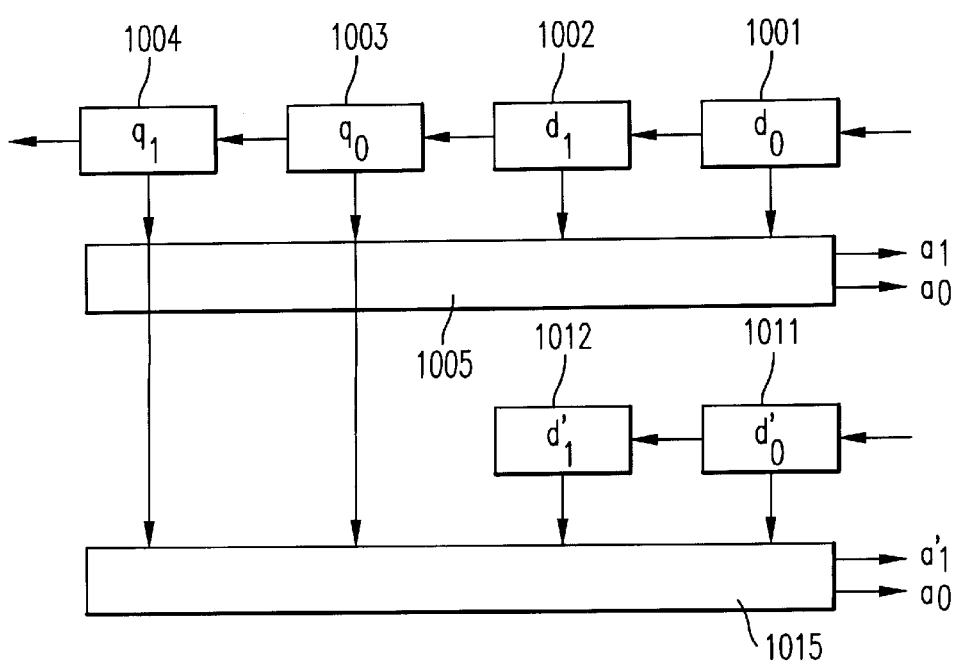
FIG. 10, an example of a complete implementation of the input and output operations.

The diagram represented in a very simplified manner in FIG. 10 is then obtained, where the rectangles 1001 to 1004 make it possible to obtain d0, d1, q0 and q1 and supply the rectangle 1005 to obtain a1 and a0.

It is then sufficient to insert the components 1011 and 1012 to obtain d'0 and d'1 and supply the component 1015, which, also being supplied by the components 1003 and 1004, delivers a'1 and a'0.

It is therefore observed that this single autonomously operating assembly makes it possible to obtain the read loops (1011, 1012), the write loops (1001–1002), the iteration loops for the TE (1003, 1004) and the assembly of components 1001 to 1004 and 1011 and 1012 may be viewed as a repetition counter.

These diagrams are merely schematic diagrams and in a concrete embodiment the person skilled in the art would for example use a RAM memory, registers, adders and comparators, thereby enabling the invention to be extended to any number of dimensions and to any size in each dimension.

What is claimed is:

1. A coding process for a signal processor for automatically determining a first coding for storage addresses for a plurality of outputs in an output array, said signal processor including a clock, the coding process comprising the steps of:

determining a first output multidimensional space, including a first set of axes and a second set of axes;

inputting an input array including a first plurality of input data elements;

selecting a second plurality of data elements from said first plurality of data elements by using an input pattern according to a first input relation and a second input relation;

transforming said input pattern according to an elementary transformation to generate an output pattern of output data elements;

generating said output array by ordering a plurality of said output pattern of said output data elements based on a first output relation and a second output relation, wherein said first set of axes correspond to axes of a quotient array generated by dividing said output array by said output pattern, said second set of axes correspond to axes of said output pattern, and said first output multidimensional space includes all output data elements of said output array ordered for successive traversal according to a first incrementation of said clock; and determining a first projection matrix from said first output multidimensional space to said output array.

2. The coding process according to claim 1, wherein:

said first input relation indicates a first ordered selection of input based on a predetermined number of said first plurality of input data elements for generating a first group of said input data elements, and said second input relation indicates a second ordered selection of input from said first group.

3. The coding process according to claim 1, further comprising the steps of:

determining a second input multidimensional space, including a third set of axes and a fourth set of axes, wherein said third set of axes correspond to axes of a quotient array generated by dividing said input array by said input pattern, wherein said third set of axes is identical to said first set of axes, and wherein said fourth set of axes correspond to axes of said input pattern, and said second input multidimensional space includes all input data elements of said input array ordered for successive traversal according to a second incrementation of said clock; and determining a second projection matrix from said input array to said second input multidimensional space, wherein said coding process automatically determines a second coding for selecting inputs in said input array.

4. A processor for implementing a coding process for automatically determining a first coding for storage addresses for a plurality of outputs in an output array, said processor comprising:

a clock;

a first counter, including a first set of multipliers, a second set of multipliers, a first summator, and a second summator;

a device configured to determine a first output multidimensional space, including a first set of axes and a second set of axes;

a device configured to input an input array including a first plurality of input data elements;

a device configured to select a second plurality of data elements from said first plurality of data elements by using an input pattern according to a first input relation and a second input relation;

a device configured to transform said input pattern according to an elementary transformation to generate an output pattern of output data elements;

a device configured to generate said output array by ordering a plurality of said output pattern of said output data elements based on a first output relation and a second output relation, wherein said first set of axes correspond to axes of a quotient array generated by dividing said output array by said output pattern, said second set of axes correspond to axes of said output pattern, and said first output multidimensional space includes all output data elements of said output array ordered for successive traversal according to a first incrementation of said clock; and a device configured to determine a first projection matrix from said first output multidimensional space to said output array, wherein said first counter is incremented by said clock, and said first counter includes a number of first stages which is at least as large as a number of axes included in said first and second sets of axes, wherein each one of said first stages includes a number of first states which is equal to a dimension of a first space of one of said axes included in said first and second sets of axes which corresponds to said each one of said first stages, and wherein said first and second sets of multipliers multiply outputs of said first stages of said first counter by a plurality of coefficients of said first projection matrix, and each one of said first set of multipliers includes at least one first adder and each one of said second set of multipliers includes at least one second adder, said first summator adds outputs of said at least one first adder and said second summator adds outputs of said at least one second adder to generate coefficients of an output vector for placing outputs in said output array.

5. The processor according to claim 4, wherein:

said first input relation indicates a first ordered selection of input based on a predetermined number of said first plurality of input data elements for generating a first group of said input data elements, and said second input relation indicates a second ordered selection of input from said first group.

6. The processor according to claim 4, further comprising:

a device configured to determine a second input multidimensional space, including a third set of axes and a fourth set of axes, wherein said third set of axes correspond to axes of a quotient array generated by dividing said input array by said input pattern, wherein said third set of axes is identical to said first set of axes, and wherein said fourth set of axes correspond to axes of said input pattern, and said second input multidimensional space includes all input data elements of said input array ordered for successive traversal according to a second incrementation of said clock; and a device configured to determine a second projection matrix from said input array to said second input multidimensional space, wherein said coding process automatically determines a second coding for selecting inputs in said input array.

7. The processor according to claim 4, further comprising:

a second counter, including a third set of multipliers, a fourth set of multipliers, a third summator, and a fourth summator;

a device configured to determine a second input multidimensional space, including a third set of axes and a fourth set of axes, wherein said third set of axes correspond to axes of a quotient array generated by dividing said input array by said input pattern, wherein said third set of axes is identical to said first set of axes, and wherein said fourth set of axes correspond to axes of said input pattern, and said second input multidimensional space includes all input data elements of said input array ordered for successive traversal according to a second incrementation of said clock; and a device configured to determine a second projection matrix from said input array to said second input multidimensional space, wherein said coding process automatically determines a second coding for selecting inputs in said input array, wherein said second counter is incremented by said clock, and said second counter includes a number of second stages which is at least as large as a number of axes included in said fourth set of axes, wherein each one of said second stages includes a number of second states which is equal to a dimension of a second space of one of said axes included in said fourth set of axes which corresponds to said each one of said second stages, and wherein said third and fourth sets of multipliers multiply outputs of said second stages of said second counter and outputs of said first stages of said first counter corresponding to axes common to said first output multidimensional space and said second input multidimensional space by a plurality of coefficients of said second projection matrix, and each one of said third set of multipliers includes at least one third adder and each one of said fourth set of multipliers includes at least one fourth adder, said third summator adds outputs of said at least one third adder and said fourth summator adds outputs of said at least one fourth adder to generate coefficients of an input vector for selecting inputs in said input array.

8. The processor according to claim 7, wherein each multiplier of said first and second sets of multipliers comprises an accumulator operating at the rate of the signals of said clock, wherein an output of said accumulator is looped onto an input of said accumulator by an accumulator adder, wherein said accumulator adder receives the value of a multiplier coefficient, and wherein a reset-to-zero input of said accumulator adder is linked to an output of a corresponding first stage of said first counter.

* * * * *